US005652759A

United States Patent [19]

Stringfellow, Jr.

[11] Patent Number: 5,652,759
[45] Date of Patent: Jul. 29, 1997

[54] METHOD AND APPARATUS FOR DELIVERING INFORMATION IN A REAL TIME MODE OVER A NONDEDICATED CIRCUIT

[75] Inventor: Dale Bruce Stringfellow, Jr., Dallas, Tex.

[73] Assignee: American Airlines, Inc., DFW Airport, Tex.

[21] Appl. No.: 490,495

[22] Filed: Jun. 14, 1995

[51] Int. Cl.$^6$ ........................................ H04J 3/12
[52] U.S. Cl. ............... 370/522; 364/949.3; 340/945; 340/973; 370/498; 395/133
[58] Field of Search ............... 370/94.2, 94.1, 370/110.1, 61, 17, 118, 60, 60.1, 498, 522; 348/12, 13, 14, 117; 455/5.1; 364/407, 401, 408, 514, 222.2, 222.4, 223.1, 284.3, 940.2, 949.3; 395/133; 340/945, 973

[56] References Cited

U.S. PATENT DOCUMENTS

| | | |
|---|---|---|
| 4,813,040 | 3/1989 | Futato . |
| 4,975,696 | 12/1990 | Salter, Jr. et al. ............ 340/973 |
| 5,021,953 | 6/1991 | Webber et al. .............. 364/407 |
| 5,057,917 | 10/1991 | Shalkauser et al. . |
| 5,191,523 | 3/1993 | Whitesage .................. 364/407 |
| 5,237,499 | 8/1993 | Garback ..................... 364/407 |
| 5,255,371 | 10/1993 | Latimer et al. . |
| 5,309,355 | 5/1994 | Lockwood .................. 364/401 |
| 5,327,235 | 7/1994 | Richards . |
| 5,339,439 | 8/1994 | Latimer et al. . |

Primary Examiner—Wellington Chin
Assistant Examiner—Huy D. Vu
Attorney, Agent, or Firm—Warren & Perez

[57] ABSTRACT

A method of transmitting real time digital video, audio and composite signals along existing delivery circuit and transmission pathways that takes advantage of unused bandwidth in existing transmission spectrums and circuit pathways. The invention permits the delivery of messages, commands and data files which may be presented later to the consumer at a predefined time and place and in a predefined format allowing the transmission of CD quality digital sound, digital video and bitmap files to a consumer, group of consumers or consumer population. The method and apparatus described transmits information and data to the consumer in a non real-time background mode which may be stored in a local repository for future presentation. Presentation parameters are transmitted either concurrently with or subsequently to information and data. The method may be employed on a wide variety of platforms including television, cable, satellite, telephone networks, private and public data networks and dedicated lines. Inputs are accepted in either analog or digital formats and converted to a digitized format prior to transmission to a subscriber or directly to the end user. The signal is reassembled in accordance with the sender's commands and presented to the consumer in real-time fashion.

7 Claims, 3 Drawing Sheets

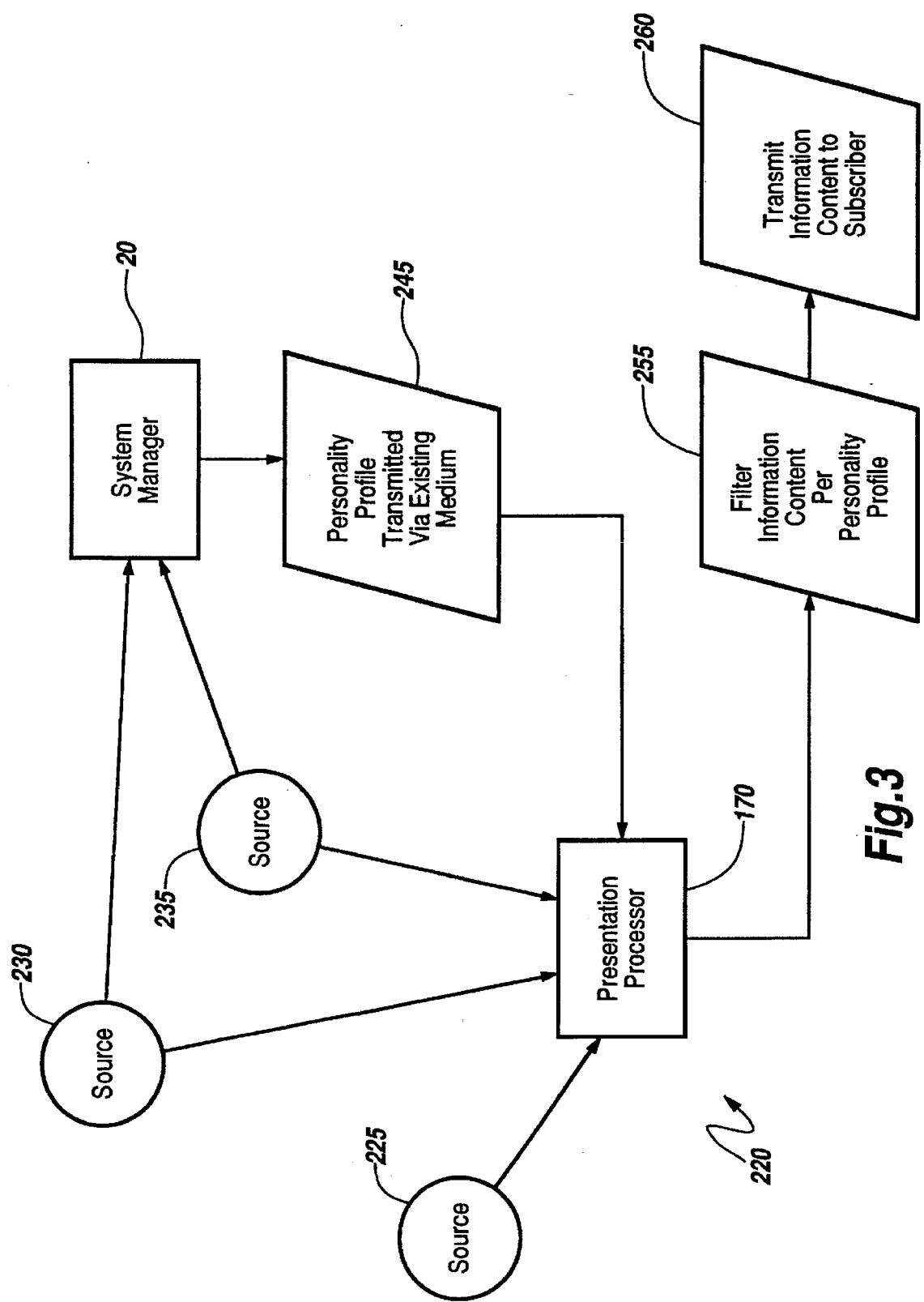

METHOD AND APPARATUS FOR DELIVERING INFORMATION IN A REAL TIME MODE OVER A NONDEDICATED CIRCUIT

TECHNICAL FIELD

The invention relates generally to the transmission of data over a non-dedicated medium and in particular to a method and apparatus of delivering digital video, audio and composites signals as well as other information formats via existing transmissions circuits to a distant location in a real time mode.

BACKGROUND OF THE INVENTION

The search for a true real-time data transmission system capable of delivering digital audio and video information has prompted the development of various new mediums and resulted in a variety of technological advances. For example, data throughput rates, computer processing speeds and processor capabilities and modem baud rates have seen dramatic increases in recent years. Other advances have led to the more prevalent use of cleaner and wider bandwidth media types capable of carrying more data such as fiber optical, coaxial cabling, digital satellite transmission systems and dedicated trunk lines.

Delivering real-time digital video and audio information to a consumer requires a dedicated delivery circuit capable of handling heavy data traffic loads. For example, transmitting and receiving CD quality digital sound requires a circuit with an 88 Kbps capability while delivering digital video requires a circuit having a 1.5 Mbs capability. While mediums capable of such speeds exist at the localized platform or network level, there is currently no known data transmission network for delivering real-time digital audio, video and composite data on an international, national or even regional basis.

Prior attempts to achieve real-time digital data transmissions focused on the use of newer and wider bandwidth medias, faster processors, compression algorithms and the like. The present invention, however, allows the transmission of digital video and audio information using existing circuits in a batch non-real-time mode which is subsequently recreated at the receiving station in a real-time mode.

Prior systems concentrated on increasing component level performance or using broader bandwidth circuits. Thus, until the present invention there was no readily available method and apparatus for transmitting digital information formats over existing broadcast systems by encoding message information in an unused portion of the broadcast spectrum.

Furthermore, until the present invention there was not a readily available method or apparatus for controlling the presentation character of the information already available by accessing existing data sources to manipulate the way information was received by the end-user. The present invention, however, discloses a method and apparatus that allows a system manager to simply transmit one or more presentation parameters that are decoded by a receiver at the consumer end and is implemented by manipulating the information received from the existing data sources in a real time display mode.

SUMMARY OF THE INVENTION

Accordingly, it is one aspect of the present invention to provide a real time digital video, audio and composite signal delivery method and apparatus that works in conjunction with existing non-dedicated circuits. By taking advantage of unused bandwidth in existing transmission spectrums and circuit pathways the present invention can deliver messages, commands and data files which may be presented later to the consumer at a predefined time and place and in a predefined format.

The present invention also provides a method of transmitting and receiving CD quality digital sound, digital video and bitmap files to a consumer, group of consumers or consumer population. In this regard, a method and apparatus is described wherein image and sound files are transmitted to the consumer in a non real-time environment and stored in a local repository for future presentation. Presentation parameters are transmitted either concurrently with or subsequently to the files to control the presentation character of the information at the receiver station.

Additionally, the present invention provides a method of delivering all types of message formats including but not limited to simple text, specialized text and digitized audio and video segments across a wide array of transmission platforms including for example television, cable, telephone networks and dedicated lines. This is accomplished by receiving either analog or digital distribution formats as an input and converting them to a standardized digital packet format prior to transmission to the consumer recipient in a background non real-time mode. The received signal is then reassembled in accordance with the sender's commands and presented to the consumer in real time fashion.

BRIEF DESCRIPTION OF THE DRAWINGS

The various features, advantages and objects of the present invention are more readily understood and appreciated by reference to the following Detailed Description in conjunction with the drawings which form a part of the specification and in which:

FIG. 3 is block diagram illustrating the data stream personality filtering process in accordance with the preferred embodiment of the invention.

DETAILED DESCRIPTION

Without limiting the scope of the invention, the method and apparatus described may be used to transmit current air flight information available from American Airlines' flight operating system, SABRE central reservation system and other central reservation systems. It should be clearly understood, however, that the invention as claimed may be implemented in other environments where the transmission of real time information is desired.

Figure 1:
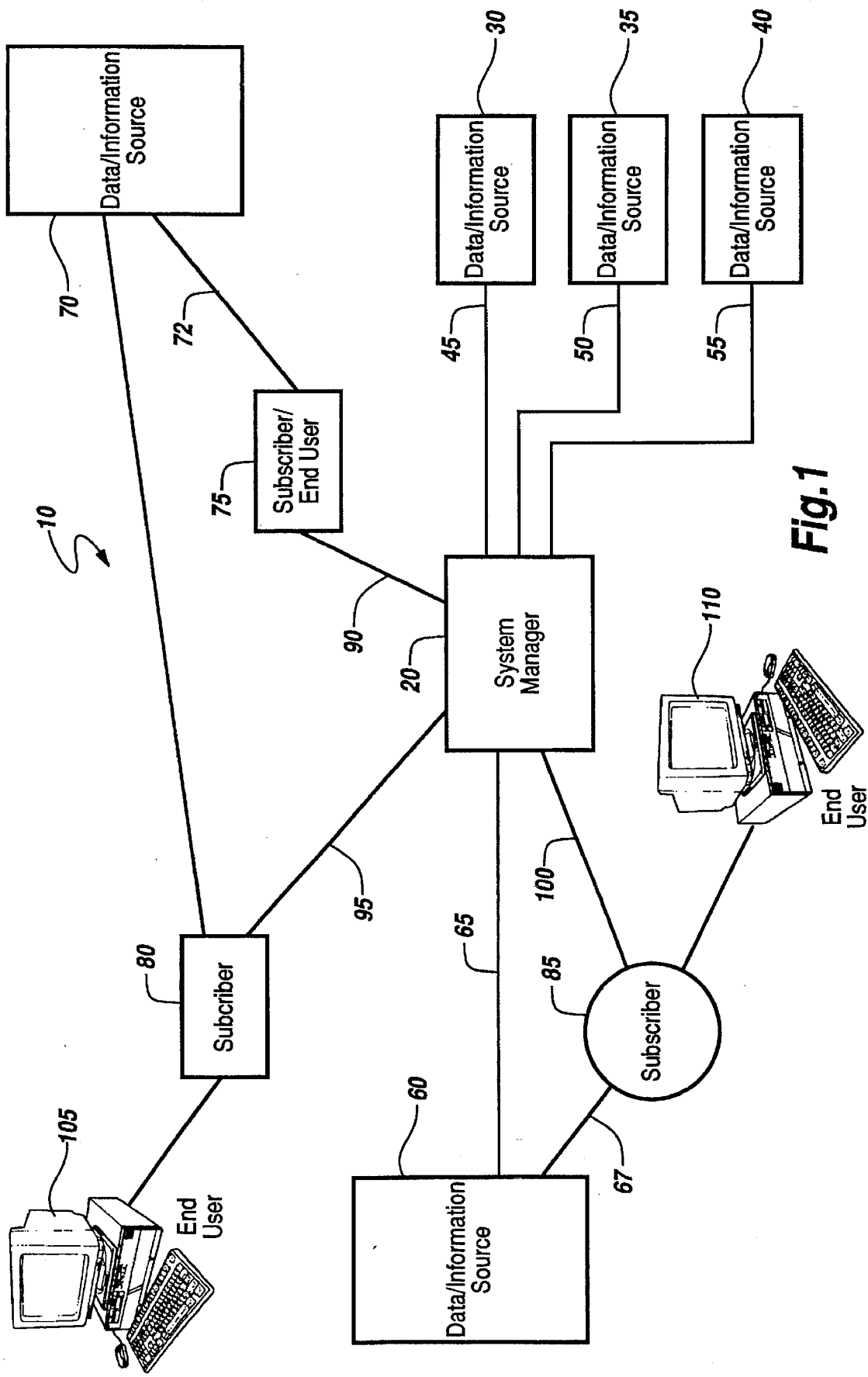
FIG. 1 is block diagram representing the topological organization of the various components of the invention in accordance with the preferred embodiment.

The overall system topology is represented as 10 in FIG. 1. As shown, a system manager 20 is centrally located to receive data and information from sources 30, 35 and 40. In the preferred embodiment sources 30, 35, and 40 comprise one or more of the existing central reservation systems, flight operating systems and back office systems used for managing flight inventory segments. In other embodiments, sources 30, 35, and 40 comprise data and information sources to which public or private access may be obtained including private data banks, cable companies and television broadcast stations, local and regional networks as well as other sources of data and information.

Communications means 45, 50 and 55 are employed to link sources 30, 35 and 40, respectively to the system manager 20. No particular link or method of transmission is crucial to achieve the objects of the present invention, but, in one embodiment communications means 45, 50 and 55 may take the form of a modem on either end of the link for transmitting or receiving data over the Public Switch Telephone Network (PSTN). In other embodiments data and information are transmitted over a Packet Switched Data Network (PSDN), dedicated trunk line, network cable, satellite transmission system, RF transmission system or any other common carrier.

Data source 70 is available use by subscriber/end user 75 directly. Data source 60 may be linked to both system manager 20 and via communications means 65 and to subscriber 85 via communications means 67. In one embodiment, system manager 20 may act as a conduit and manipulator of data and information received from data source 60 prior to transmission to subscriber 85. In this case, system manager 20 transmits data and information from data source 60 to subscriber 85 in a non real-time background mode. The data and information may be filtered, enhanced or otherwise manipulated in transmitted in a data stream over network lines using a modem set or other transmission means.

In another embodiment, subscribers 75 and 85 may obtain data and information directly from data source 60 and 70, respectively. System manager 20 then transmits data and information parameters which control the presentation behavior of the data and information to subscriber 85 permitting a receptor at the subscriber 85 location to manipulate the data or information received from data source 60 locally.

In one embodiment, data source 60 comprise a local flight reservation back office system currently in existence at major cities across the world. As such, data source 60 contains status information regarding flights such as gate, terminal, scheduled time of departure, status of flight and other fields of information concerning outgoing and incoming flights for all airlines flying in or departing from a given location. Subscriber 85 may comprise a particular airline wishing to display flight information to its customers regarding their flights. In this embodiment, system manager 20 may transmit parameters to a receptor at subscriber's location that would cause the subscriber 85 to display only that airline flight information corresponding to its flights.

Subscribers 80 and 85, end user 105 and 110 and subscriber/end user 75 comprise the various entities which receive data and information and are linked to the system manager 20 via separate communications means. As shown, data source 60 is communicably linked to the system manager 20 via communications means 65 and to subscriber 85 via communications means 67. Also shown is that data source 70 communicates with subscriber/end user 75 via communications means 72. The invention is independent of the particular type of communications means 67, 72 and particular data sources 60 and 70 employed.

Likewise, subscriber/end user 75, subscriber 80 and subscriber 85 are arranged for receiving data from the system manager 20 via communications means 90, 95 and 100, respectively.

As with other aspects of the present invention, the number and type of subscriber/end users 75, subscribers 80 and subscribers 85 is unlimited. In some embodiments the subscriber/end user 75, subscribers 80 and 85 may comprise a network distribution hub or node, television broadcast station, cable company, cable distribution head-end system, electronic bulletin board, isolated data or video terminal, RF, VHF and UHF receptors and other similar consumer information distribution systems. In other embodiments, subscriber 85 may be a group or region of cable company customers wishing to modify their access to cable broadcasting. Yet in other embodiments, subscriber 85 may comprise a personal computer user or group of users. No particular link, method of transmission or subscriber 85 type is necessary to achieve the objects of the present invention The end user 105 and end user 110 may be arranged and configured to receive transmissions from subscriber 80 and subscriber 85, respectively, allowing a more localized distribution of consumer information. In one embodiment, end users 105 and 110 comprise the display terminals commonly seen at major airports for displaying flight information. In other embodiments, end users 105 and 110 comprise individual television sets, computer terminal displays and other similar apparatus for receiving data and information from various subscribers 80 and 60 types, respectively.

In one implementation of the invention, the system manager 20 defines an Information Personality Profile (IPP) for the subscriber/end user 75. The IPP is transmitted to the subscriber/end user 75 to control and define the content of consumer data and information received from the data source 70 via communications means 72.

In another implementation, the consumer data and information from a data source, 45 for example, is transmitted to the subscriber 80 along with the IPP via communications means 95. Preferably, it is the subscriber/end user 75 and subscribers 80 and 85 which are responsible for executing the IPP at the local consumer level by filtering, interpreting, enhancing and otherwise manipulating the data stream from the data source via a set of predefined IPP rules common to both the system manager 20 and the subscriber/end user 75 and subscribers 80 and 85. In this way, data received from data/information sources 30, 35 and 40 as well as data information sources 60 and 75 may be parsed according to the subscribers 75, 80 and 85 and end user 105 and 110 IPPs.

Figure 2:
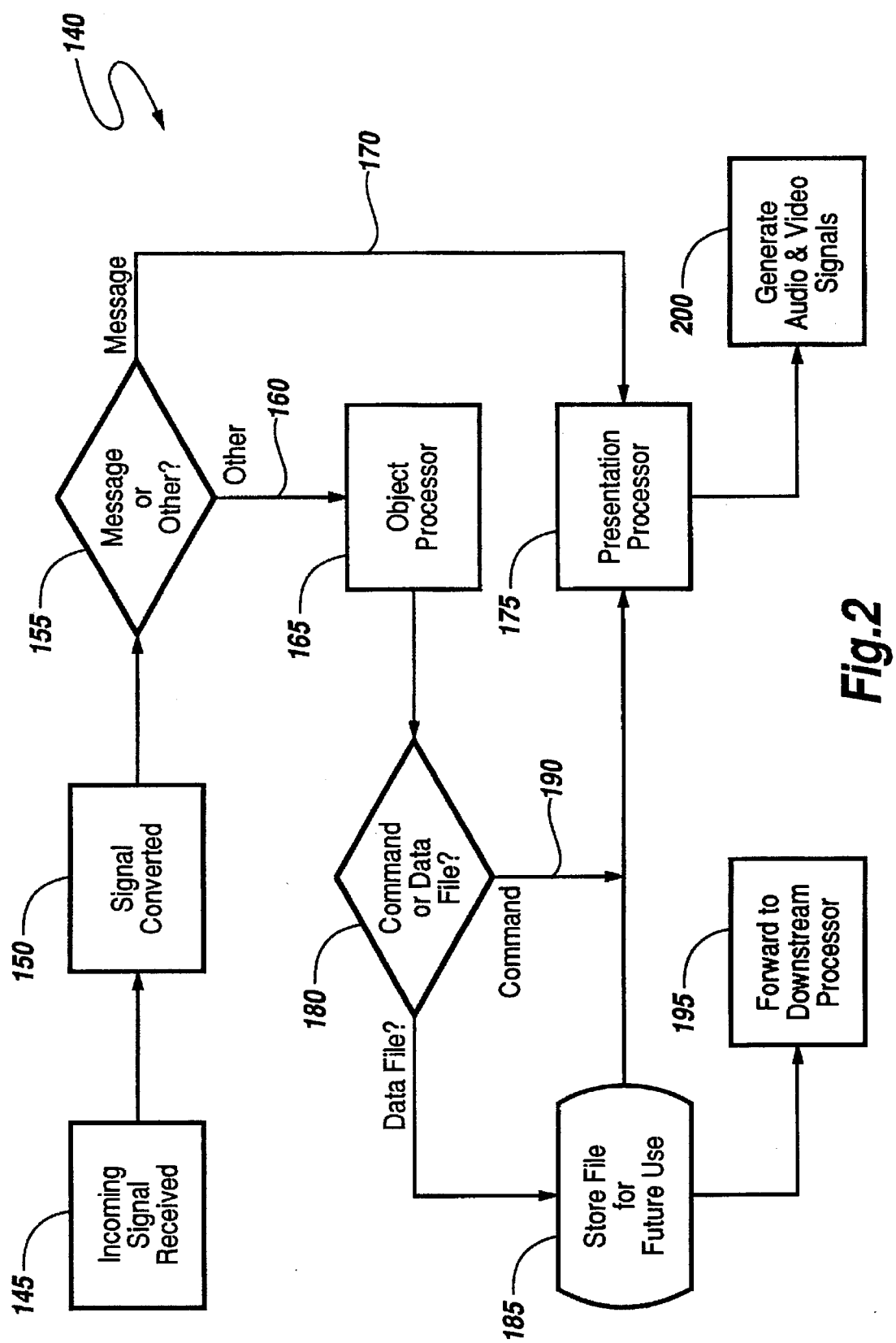
FIG. 2 is a process flow diagram depicting the process in accordance with the preferred embodiment of the invention.

Reference is now made to FIG. 2 which illustrates the process, designated as 140, preferably used to deliver information in a real time mode to a distant subscriber. An incoming signal 145 is received by a receive decoder and converts the signal 150 into an appropriate format. In one embodiment, the receive decoder is a standard modem which converts an analog signal to its equivalent digital format at processor 150 and transmits the signal via an RS-232 or equivalent interface to a computerized platform for further processing by a receive processor.

The receive processor parses the signal and determines whether a message or other data object 155 is present in the data stream and discards unrecognized portions of the data stream. If a message is detected, the receive processor passes the message to a presentation processor 175. The presentation processor 175 is responsible for creating the appropriate display format which conforms to a predefined IPP.

Other objects in the data stream are communicated 160 by the receive processor to an object processor 165 for further parsing. At this point, the object processor 165 determines whether a command or data file 180 is present in the data stream. A data file may comprise a plurality of information formats such as text, video and sound files, mixed format files, database files, update files, program files as well as other formats. The data files 180 are stored 185 for use in a local system repository and may be downloaded to the presentation processor 175 at some later point.

A command 190 in the data stream is passed directly to the presentation processor 175. Commands 190 are used by the presentation processor 175 to implement a plurality of profile parameters which control how information is received by the consumer or displayed to end users. For example, the presentation processor 175 may be programmed via commands 190 transmitted by system manager 20 to effect the geographic location and time information is distributed to an end user 105, 110 or subscriber/end user 75.

Other profile parameters for example such as those relating to the social, economic, language and cultural aspects of the information content received by the relevant consumers may also be used in determining the IPP. In this way, a system manager 20 may transmit a command 190 which causes the presentation processor 175 to "block off" a particular information source (such as a TV or cable channel) during a given time to a specific receiver, group of receivers, or to an entire receiving population depending on the subscriber type. In another embodiment, the process 140 may be implemented on an individual viewer level to control the gender, purchasing history of the consumer base, product preference, program view history, desires and personal characteristics of the information content received by the consumer.

The presentation processor 175 may use the stored object file 185 to manufacture a packaged message which is transmitted to the consumer via existing information delivery circuits. For example, a message 170 may be encoded and transmitted by the presentation processor 175 over an unused bandwidth of existing television frequency broadcast channels using its Vertical Blanking Interval (VBI). Thus, information from data/information sources 60 and 70 such as airline flight information may be encoded by the presentation processor 175 and transmitted on existing broadcast bandwidth to the consumer in a format defined by the IPP. Likewise, the presentation processor 175 may also transmit the information over an unused cable channel allowing cable customers to view the information by selecting a specific channel in the cable broadcast. The IPP, in turn, is influenced by commands 190 transmitted by the system manager 20.

Process 140 flow continues to generating the appropriate audio and video signals 200 for distribution to the consumer via existing transmission pathways such as local television and cable channels, computer networks, PSTN, PSDN or others. A downstream processor 195 may be used as an interface between the stored data files and a local cable distribution front end. The video and audio signals may be generated by personal computer peripheral cards capable of producing mixed signal composite outputs.

Turning now to FIG. 3, an overview of the information manipulation process 220 is shown. Information sources 225, 230, and 235 are available to both the system manager 20 and the presentation processor 175. The data stream received from information sources 225, 230, and 235 may vary in content but generally comprises data files from known data sources.

The system manager 20 transmits predefined profile parameters 245 via existing delivery circuits and transmission pathways to the presentation processor 170. The profile parameters may comprise a single command packaged in a formatted data packet which the presentation processor 175 uses to filter, interpret, enhance or otherwise manipulate the data stream received from one or more information sources 225, 230, and 235.

The system manager 20 may also transmit data files to the presentation processor 175 which are stored in a local information repository 185 and delivered to the consumer per the profile parameters 245 at a predesignated time and format. All data information content is manipulated 255 per the profile parameters 245 prior to transmission to the subscriber 260.

Modifications of this invention will occur to those skilled in this art. Therefore, it is to be understood that this invention is not limited to the particular embodiments disclosed, but that it is intended to cover all modifications which are within the true spirit and scope of this invention as claimed.

What is claimed is:

1. A method of delivering flight schedule information and data to end users in real-time comprising the steps of:

a) establishing a first communications link between a source of flight schedule information and data and a subscriber, the subscriber having a means of transmitting the flight schedule information and data across broadcast channels to end users;

b) establishing a second communications link between the subscriber and a systems manager;

c) transmitting a personality profile from the systems manager to the subscriber, the personality profile containing parameters defining the presentation of the flight schedule information and data;

d) using the personality profile to manipulate the flight schedule information and data;

e) transmitting the manipulated flight schedule information and data to the end users in one or more data streams;

f) decoding said one or more data streams to separate the manipulated flight schedule information and data into object files, programs and commands;

g) storing the object files in a depository for future use;

h) passing the commands and programs to a presentation processor; and i) using the commands and programs to manipulate the object files and create a real-time presentation of the flight schedule information and data to the end users.

2. The method according to claim 1 wherein the parameters define the time and place to present the object files to the end users.

3. The method according to claim 1 wherein the manipulated flight schedule information and data is transmitted to the end users in a non real-time mode.

4. The method according to claim 1 wherein the source of flight schedule information and data is an airline reservation system computer.

5. The method according to claim 1 wherein the flight schedule information and data contains CD quality digital sound, video and bitmap file formats.

6. The method according to claim 1 wherein the parameters are transmitted to the subscriber subsequent to the flight schedule information and data.

7. The method according to claim 1 wherein the communications link between the source of the flight schedule information and data and the subscriber is the public switched telephone network.

* * * * *